United States Patent
Sarazin

(10) Patent No.: US 12,427,738 B2
(45) Date of Patent: Sep. 30, 2025

(54) METHOD FOR MANUFACTURING AN OPTIMIZED LAYER OF SELF-SEALING PRODUCT

(71) Applicant: COMPAGNIE GENERALE DES ETABLISSEMENTS MICHELIN, Clermont-Ferrand (FR)

(72) Inventor: Frederic Sarazin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 142 days.

(21) Appl. No.: 18/029,337

(22) PCT Filed: Sep. 24, 2021

(86) PCT No.: PCT/FR2021/051648
§ 371 (c)(1),
(2) Date: Mar. 29, 2023

(87) PCT Pub. No.: WO2022/069821
PCT Pub. Date: Apr. 7, 2022

(65) Prior Publication Data
US 2023/0405953 A1    Dec. 21, 2023

(30) Foreign Application Priority Data
Sep. 29, 2020  (FR) .................................. 2009911

(51) Int. Cl.
*B29D 30/06* (2006.01)
(52) U.S. Cl.
CPC .. *B29D 30/0685* (2013.01); *B29D 2030/0694* (2013.01)

(58) Field of Classification Search
None
See application file for complete search history.

(56) References Cited

U.S. PATENT DOCUMENTS

| | | |
|---|---|---|
| 4,113,799 A | 9/1978 | Van Ornum et al. |
| 4,115,172 A | 9/1978 | Baboff et al. |

(Continued)

FOREIGN PATENT DOCUMENTS

| | | |
|---|---|---|
| CN | 105377587 A | 3/2016 |
| CN | 107000341 A | 8/2017 |

(Continued)

OTHER PUBLICATIONS

International Search Report dated Feb. 1, 2022, in corresponding PCT/FR2021/051648 (4 pages).

*Primary Examiner* — Joseph S Del Sole
(74) *Attorney, Agent, or Firm* — VENABLE LLP

(57) ABSTRACT

The manufacturing method makes it possible to manufacture a tire (10) comprising: a tread (14), an airtight internal layer (18), and at least one layer of a self-sealing product (80) extending circumferentially radially on the inside of part of the airtight internal layer (18). During the method, a strip or a bead (200) of a self-sealing product is wound through multiple circumferential turns (Nai, Nbj) radially on the inside of the airtight layer (18) of the tire, which does not have the layer of self-sealing product (80) yet, and at least partially in line with the tread (18). The winding step is carried out according to a law for winding the strip or the bead (200) in circumferential turns. During the winding step, at least one parameter of the winding law making it possible to axially vary the thickness of the layer of self-sealing product (80) is varied.

7 Claims, 4 Drawing Sheets

(56) References Cited

U.S. PATENT DOCUMENTS

| | | |
|---|---|---|
| 4,359,354 A | 11/1982 | Bohm |
| 4,426,468 A | 1/1984 | Ornum et al. |
| 4,745,954 A | 5/1988 | Toyohara et al. |
| 4,913,209 A | 4/1990 | Hong et al. |
| 5,085,942 A | 2/1992 | Hong et al. |
| 5,295,525 A | 3/1994 | Sanda, Jr. |
| 8,573,271 B2 | 11/2013 | Lopez et al. |
| 8,957,132 B2 | 2/2015 | Voge et al. |
| 9,243,133 B2 | 1/2016 | Voge et al. |
| 9,415,639 B2 | 8/2016 | Voge et al. |
| 9,677,025 B2 | 6/2017 | Voge et al. |
| 10,195,907 B2 | 2/2019 | Washizuka et al. |
| 10,399,391 B2 | 9/2019 | Majumdar et al. |
| 10,730,255 B2 | 8/2020 | Barjon et al. |
| 10,870,319 B2 | 12/2020 | Frantzen et al. |
| 2010/0300593 A1 | 12/2010 | Merino Lopez et al. |
| 2013/0202829 A1 | 8/2013 | Voge et al. |
| 2013/0203913 A1 | 8/2013 | Voge et al. |
| 2013/0263990 A1 | 10/2013 | Voge et al. |
| 2016/0032215 A1 | 2/2016 | Voge et al. |
| 2016/0159158 A1 | 6/2016 | Washizuka et al. |
| 2016/0167455 A1 | 6/2016 | Majumdar et al. |
| 2017/0080655 A1 | 3/2017 | Barjon et al. |
| 2019/0359013 A1 | 11/2019 | Frantzen et al. |
| 2020/0189215 A1 | 6/2020 | Griffoin et al. |
| 2023/0001747 A1 | 1/2023 | Nakajima |
| 2023/0311590 A1 | 10/2023 | Sarazin |
| 2023/0364869 A1 | 11/2023 | Sarazin |

FOREIGN PATENT DOCUMENTS

| | | |
|---|---|---|
| DE | 102016212472 A1 | 1/2018 |
| EP | 1090069 B1 | 7/2004 |
| EP | 2167329 B1 | 12/2012 |
| EP | 2629964 A2 | 8/2013 |
| EP | 3266627 A1 | 1/2018 |
| EP | 3572218 A1 | 11/2019 |
| EP | 3666510 A2 | 6/2020 |
| FR | 2955587 A1 | 7/2011 |
| JP | 2016-221991 A | 12/2016 |
| KR | 10-1497839 B1 | 3/2015 |
| WO | 99/62998 A1 | 12/1999 |
| WO | 2011/092122 A1 | 8/2011 |
| WO | 2011/092123 A1 | 8/2011 |
| WO | 2015/173120 A1 | 11/2015 |
| WO | 2020/009849 A1 | 1/2020 |

METHOD FOR MANUFACTURING AN OPTIMIZED LAYER OF SELF-SEALING PRODUCT

BACKGROUND

The present invention relates to a method for manufacturing a tyre. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape exhibiting symmetry of revolution about a main axis of the tyre.

EP2629964 discloses a tyre comprising a tread intended to come into contact with the ground, when the tyre is running, via a tread surface. The tread comprises main circumferential cuts and central ribs, each of which is arranged axially between two adjacent main circumferential cuts and which are axially delimited by the said two adjacent main circumferential cuts.

The tyre of EP2629964 comprises an airtight internal layer intended to form a cavity which is airtight with respect to the inflation gas when the tyre is mounted on a mounting support, for example a rim, and a layer of a self-sealing product extending circumferentially radially on the inside of part of the airtight internal layer.

In order to manufacture such a tyre, what is known is a method in which a strip or a bead of a self-sealing product is wound through multiple circumferential turns radially on the inside of the airtight layer of the tyre, which does not have the layer of self-sealing product yet, and at least partially in line with the tread.

The winding step is carried out according to a law for winding the strip or the bead, wherein the parameters of the law remain constant during the winding step. Thus, in the case of a strip, the strip is wound so as to form a lapping, that is to say such that two successive circumferential turns partially axially overlap. In the case of a bead, the bead is wound by laying a circumferential turn of bead substantially at an axial distance equal to half of the axial width of the bead of the preceding circumferential turn, such that the self-sealing product of the circumferential turn is in contact with the self-sealing product of the preceding circumferential turn. In the case of a strip, the amount of axial overlap between two successive circumferential turns is constant and, in the case of a bead, the distance at which two successive turns are laid in relation to one another is also constant.

In the event of perforation of the tyre owing to a perforating object, the layer of self-sealing product makes it possible to seal the orifice created by the perforating object under the effect of the internal pressure of the tyre. This is because, under the effect of the internal pressure of the tyre, the self-sealing product is made to flow into the orifice through which the air streams towards the outside, in order to seal it and re-establish airtightness with respect to the inflation gas. Numerous self-sealing products have been described in the prior art, notably in U.S. Pat. No. 4,426,468, EP1090069, WO99/62998, U.S. Pat. Nos. 4,113,799, 4,115,172, 4,913,209, 5,085,942, 5,295,525, FR2955587 and EP2167329.

The presence of the layer of self-sealing product, although it has proven to be effective at combating perforations, necessarily causes the tyre to become heavier than a tyre that lacks a layer of self-sealing product.

An aim of the invention is to provide a method for manufacturing a tyre provided with a layer of sealing product, which is as lightweight as possible and of which the layer of self-sealing product is substantially as effective against perforations as the layers of self-sealing product of the tyres of the prior art.

SUMMARY

To that end, a subject of the invention is a method for manufacturing a tyre comprising:
  a tread,
  an airtight internal layer,
  at least one layer of a self-sealing product extending circumferentially radially on the inside of part of the airtight internal layer,
  during which method a strip or a bead of a self-sealing product is wound through multiple circumferential turns radially on the inside of the airtight layer of the tyre, which still does not have the layer of self-sealing product, and at least partially in line with the tread, the winding step being carried out according to a law for winding circumferential turns of the strip or of the bead,
  during the winding step, at least one parameter of the winding law making it possible to axially vary the thickness of the layer of self-sealing product over at least 50% of the circumferential length of the layer of self-sealing product is varied.

The inventors responsible for the invention have determined that certain axial portions of the tread run a greater risk of being perforated than other axial portions of the tread. Thus, the method according to the invention makes it possible to deliberately vary the thickness of the layer of self-sealing product in order to differentiate the axial portions of the layer of self-sealing product that are arranged in line with the axial portions of the tread that run a relatively high risk of perforation with respect to the axial portions of the layer of self-sealing product that are arranged in line with the axial portions of the tread that run a low risk of perforation. By virtue of the invention, and depending on the use of the tyres and of the tread, those skilled in the art will be able to determine which axial portions of the tread run a relatively high risk of perforation and arrange a relatively thick axial portion of the layer of self-sealing product in line therewith. In a similar way, those skilled in the art will be able to determine which axial portions of the tread run a low risk of perforation and arrange a relatively thin axial portion of the layer of self-sealing product in line therewith, or even have no thickness of the layer of self-sealing product at all.

In the event of perforation of the tyre owing to a perforating object, the layer of self-sealing product makes it possible to seal the orifice created by the perforating object under the effect of the internal pressure of the tyre. This is because, under the effect of the internal pressure of the tyre, the self-sealing product is made to flow into the orifice through which the air streams towards the outside, in order to seal it and re-establish airtightness with respect to the inflation gas.

To manufacture such a layer of self-sealing product, the method according to the invention provides that one of the parameters of the law for winding the circumferential turns is varied. Thus, the arrangement of the circumferential turns in relation to one another is axially varied so as to vary, in the case of a strip, the amount of axial overlap between two successive circumferential turns and, in the case of a bead, the distance at which two successive circumferential turns are laid. By varying one or more of the parameters, it is thus possible to vary the thickness of the layer of self-sealing product.

Strip is understood to mean an elongate element of self-sealing product with a cross section having a larger dimension L in a first direction and a smaller dimension I in a second direction perpendicular to the first direction, the ratio L/I being greater than or equal to 1.50. Bead is understood to mean an elongate element of self-sealing product for which L/I is strictly less than or equal to 1.50.

Because the layer of self-sealing product exhibits an axially variable thickness over at least 50% of the circumferential length of the layer of self-sealing product, it becomes possible to envisage embodiments in which the tyre does not have a layer of self-sealing product over at most 50% of the circumferential length of the layer of self-sealing product, or embodiments in which the layer of self-sealing product extends over 100% of the circumferential length of the layer of self-sealing product without otherwise exhibiting a variable thickness over 100% of the circumferential length. Of course, in order to maximize the effects of the invention, the layer of self-sealing product exhibits a variable thickness over at least 75%, more preferably over at least 95% and ideally over 100% of the circumferential length of the layer of self-sealing product.

In an embodiment that makes it possible to easily vary the thickness of the layer of self-sealing product, certain specific parameters are chosen. Thus, during the winding step, at least one of the parameters of the winding law making it possible to axially vary the thickness of the layer of self-sealing product is varied, the said at least one parameter being chosen from among:
- a winding pitch of the strip or of the bead,
- a winding speed of the strip or of the bead in relation to a device for applying the strip or the bead to the inside of the tyre,
- an axial movement speed of the tyre in relation to a device for applying the strip or the bead to the inside of the tyre,
- an extrusion rate of a device for extruding the strip or the bead,
- a width of the strip or of the bead,
- a thickness of the strip or of the bead, and preferably, the winding pitch of the strip or of the bead is varied.

All these parameters are known to those skilled in the art. The winding pitch is the axial distance between one and the same edge of the strip or of the bead of two successive circumferential turns. The winding speed is the relative circumferential speed of rotation of the tyre in relation to the device for applying the strip or the bead to the inside of the tyre. The axial movement speed is the relative axial movement speed of the tyre in relation to the device for applying the strip or the bead. The width of the strip is the value of the largest dimension L described above. The thickness of the strip is the value of the smallest dimension I described above. It should be noted that, by setting the width or the thickness to zero, it is possible to obtain axial portions of the layer of self-sealing product that have a thickness of zero.

In a preferred embodiment, the variation in thickness is obtained by varying the number of layers. Thus:
- the strip or the bead is wound on itself through $Nai>1$ radially superposed circumferential turns over $L \geq 1$ axial portion(s) of the layer of self-sealing product, with i ranging from 1 to L,
- the strip or the bead is wound on itself through $Nbj>1$ radially superposed circumferential turns or the strip or the bead is wound through $Nbj=1$ circumferential turn over $M \geq 1$ axial portion(s) of the layer of self-sealing product, with j ranging from 1 to M, for each value of i ranging from 1 to L, and for at least 50% of the values of j ranging from 1 to M, preferably for 100% of the values of j ranging from 1 to M, $Nbj<Nai$.

In this embodiment, in one variant, $Na1=Na2=\ldots NaL$ and $Nb1=Nb2=\ldots NbM$, and thus the relationship $Nbj<Nai$ is satisfied for each value of i ranging from 1 to L and for 100% of the values of j ranging from 1 to M. In other variants, certain values of Nai could be different from the others depending on the compromise between effectiveness and gain in mass desired for the layer of self-sealing product, and the relationship $Nbj<Nai$ could be satisfied for each value of i and for at least 50% of the values of j, preferably for 100% of the values of j when it is desired to maximize the gain in mass. Similarly, and for the same reason, certain values of Nbj could be different from the others.

In preferred embodiments, for each value of i ranging from 1 to L, at least 50% of the values of j ranging from 1 to M, preferably 75% of the values of j ranging from 1 to M and more preferably 100% of the values of j ranging from 1 to M are such that $Nai/Nbj \geq 1.20$, preferably $Nai/Nbj \geq 1.50$, more preferably $Nai/Nbj \geq 1.75$ and even more preferably $Nai/Nbj \geq 2.00$. For a given value of Nai, the higher the ratio Nai/Nbj is, the smaller the thickness of the axial portion comprising Nbj circumferential turns is and the greater the gain in mass is. For a given value of Nbj, the higher the ratio Nai/Nbj is, the larger the thickness of the axial portion comprising Nai circumferential turns is, thereby promoting the effectiveness of the sealing of a possible orifice in the axial portion(s) of the tread at high risk of perforation.

In certain embodiments, for each value of i ranging from 1 to L, at least 50% of the values of j ranging from 1 to M, preferably 75% of the values of j ranging from 1 to M and more preferably 100% of the values of j ranging from 1 to M are such that $Nai/Nbj \geq 3.00$, preferably $Nai/Nbj \geq 2.75$ and more preferably $Nai/Nbj \geq 2.50$. For a given value of Nai, the smaller the ratio Nai/Nbj is, the larger the thickness of the axial portion comprising Nbj circumferential turns is and the better the effectiveness of the sealing of a possible orifice in the or each axial portion at low risk of perforation is, which orifice, even though it is reduced in relative terms, exists all the same. For a given value of Nbj, the smaller the ratio Nai/Nbj is, the smaller the thickness of the axial portion comprising Nai circumferential turns is, thereby making it possible to reduce the mass of self-sealing product.

In one embodiment, with the layer of self-sealing product being axially delimited by two axial ends, the strip or the bead of self-sealing material is wound without interrupting the strip or the bead between the two axial ends. This reduces the application time for the layer of self-sealing product.

In one likewise advantageous embodiment, with the layer of self-sealing product being axially delimited by two axial ends, the strip or the bead of self-sealing material is wound starting from one of the said axial ends and the winding of the strip or of the bead of self-sealing material is stopped when the other one of the said axial ends is reached.

Another subject of the invention is a tyre obtained by a method as defined above.

On a new tyre, the depth of a cut is the maximum radial distance between the bottom of the cut and its projection onto the ground when the tyre is running. The maximum value for the depths of the cuts is referred to as the tread pattern height.

A cut denotes either a groove, or a sipe and forms a space opening onto the tread surface.

A sipe or a groove has, on the tread surface, two main characteristic dimensions: a width and a curvilinear length which are such that the curvilinear length is at least equal to two times the width. A sipe or a groove is therefore delimited by at least two main lateral faces determining its curvilinear length and connected by a bottom face, the two main lateral faces being distant from one another by a non-zero distance referred to as the width of the cut.

On a new tyre, the width W of a cut is the maximum distance between the two main lateral faces measured, when the cut is not chamfered, at a radial side coincident with the tread surface and, when the cut is chamfered, at the radially outermost radial side of the cut and radially innermost side of the chamfer. The width is measured substantially perpendicularly to the main lateral faces.

The axial width of a cut, for its part, is measured in the axial direction of the tyre, for example in a meridian section plane of the tyre.

A sipe is such that the distance between the main lateral faces is suitable for enabling the main lateral faces that delimit the said sipe to come into at least partial contact in the contact patch, notably when the tyre is new and under normal running conditions, these notably including the fact that the tyre is under nominal load and at its nominal pressure.

A groove is such that the distance between the main lateral faces is such that these main lateral faces cannot come into contact with one another under normal running conditions, these notably including the fact that the tyre is under nominal load and at its nominal pressure.

A cut may be transverse or circumferential.

A transverse cut is such that the cut extends in a mean direction that makes an angle strictly greater than 30°, preferably greater than or equal to 45° with the circumferential direction of the tyre. The mean direction is the shortest curve that joins the two ends of the cut and is parallel to the tread surface. A transverse cut may be continuous, which is to say not interrupted by a tread pattern block or another cut, such that the two main lateral faces that determine its length are uninterrupted over the length of the transverse cut. A transverse cut may equally be discontinuous, which is to say interrupted by one or more tread pattern blocks and/or one or more other cuts, such that the two main lateral faces that determine its length are interrupted by one or more tread pattern blocks and/or one or more other cuts.

A circumferential cut is such that the cut extends in a mean direction that makes an angle less than or equal to 30°, preferably less than or equal to 10° with the circumferential direction of the tyre. The mean direction is the shortest curve that joins the two ends of the cut and is parallel to the tread surface. In the case of a circumferential cut that is continuous, the two ends coincide with one another and are joined by a curve that makes a full circuit of the tyre. A circumferential cut may be continuous, which is to say not interrupted by a tread pattern block or another cut, such that the two main lateral faces that determine its length are uninterrupted over a full circuit of the tyre. A circumferential cut may equally be discontinuous, which is to say interrupted by one or more tread pattern blocks and/or one or more other cuts, such that the two main lateral faces that determine its length are interrupted by one or more tread pattern blocks and/or one or more other cuts over a full circuit of the tyre.

In the case of a circumferential cut that is situated outside of the median plane of the tyre, the lateral faces are referred to as axially inner face and axially outer face, the axially inner face being arranged, at a given azimuth, axially on the inside of the axially inner face in relation to the median plane.

Each circumferential cut comprises axially inner and outer axial ends. Irrespective of whether a circumferential cut has a chamfer or not, each axially inner and outer axial end coincides with each axial edge of a circumferential cut located on the tread surface and therefore in contact with the ground on which the tyre is running.

In the case of a transverse cut, the lateral faces are referred to as leading face and trailing face, the leading face being the one of which the edge, for a given circumferential line, enters the contact patch before the edge of the trailing face.

In some embodiments, the or each circumferential cut, whether it is a main circumferential cut or not, is chamfered. A chamfer on a circumferential cut may be a straight chamfer or rounded chamfer. A straight chamfer is formed by a planar face that is inclined with respect to the axially inner and outer face that it continues as far as the axially inner or outer edge axially delimiting the circumferential cut. A rounded chamfer is formed by a curved face that merges tangentially into the axially inner or outer face that it continues. A chamfer on a circumferential cut is characterized by a height and a width which are respectively equal to the radial distance and to the axial distance between the point common to the axially inner or outer face continued by the chamfer and the axially inner or outer edge that axially delimit the circumferential cut.

In some embodiments, the or each transverse cut is chamfered. In other words, each transverse cut is radially delimited by leading and trailing faces that circumferentially delimit the said transverse cut and are connected to one another by a bottom face that delimits the said transverse cut radially inwards. A chamfer on a transverse cut may be a straight chamfer or rounded chamfer. A straight chamfer is formed by a planar face that is inclined with respect to the leading or trailing face that it continues as far as the leading or trailing edge circumferentially delimiting the transverse cut. A rounded chamfer is formed by a curved face that merges tangentially into the leading or trailing face that it continues. A chamfer on a transverse cut is characterized by a height and a width which are respectively equal to the radial distance and to the distance in a direction perpendicular to the leading or trailing faces between the point common to the leading or trailing face continued by the chamfer and the leading or trailing edge that circumferentially delimit the transverse cut.

In the conventional way, the axial ends of the tread are determined to be the axial ends of the tyre of the tread surface in contact with the ground on which the tyre is running on an unladen tyre mounted on a nominal rim and inflated to its nominal pressure, within the meaning of the European Tyre and Rim Technical Organization, or "ETRTO", standard of 2019. In the event of an obvious boundary between the tread surface and the rest of the tyre, the axial ends of the tread are simply determined. If the tread surface is continuous with the external surfaces of the sidewalls of the tyre, each axial end of the tread passes through the point at which the angle between the tangent to the tread surface and a straight line parallel to the axial direction passing through this point is equal to 30°. When, in a meridian section plane, there are several points for which the said angle is equal, in terms of absolute value, to 30°, it is the radially outermost point that is adopted.

The tyre according to the invention has substantially the shape of a torus about an axis of revolution substantially coincident with the axis of rotation of the tyre. This axis of revolution defines three directions conventionally used by a person skilled in the art: an axial direction, a circumferential direction and a radial direction.

The expression "axial direction" means the direction substantially parallel to the axis of revolution of the tyre, that is to say the axis of rotation of the tyre.

The expression "circumferential direction" means the direction that is substantially perpendicular both to the axial direction and to a radius of the tyre (in other words, tangent to a circle centred on the axis of rotation of the tyre).

The expression "radial direction" means the direction along a radius of the tyre, that is to say any direction that intersects the axis of rotation of the tyre and is substantially perpendicular to that axis.

The expression "median plane of the tyre" (denoted M) is understood to mean the plane perpendicular to the axis of rotation of the tyre which is situated axially mid-way between the two beads and passes through the axial middle of the crown reinforcement.

The expression "equatorial circumferential plane of the tyre" (denoted E) is understood to mean, in a meridian section plane, the plane passing through the equator of the tyre, perpendicular to the median plane and to the radial direction. The equator of the tyre is, in a meridian section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The meridian plane is understood to be a plane parallel to and containing the axis of rotation of the tyre and perpendicular to the circumferential direction.

"Radially inside" and "radially outside" are understood to mean "closer to the axis of rotation of the tyre" and "further away from the axis of rotation of the tyre", respectively. "Axially inner" and "axially outer" are understood to mean "closer to the median plane of the tyre" and "further away from the median plane of the tyre", respectively.

A bead is understood to be the portion of the tyre intended to enable the tyre to be attached to a mounting support, for example a wheel comprising a rim. Thus, each bead is notably intended to be in contact with a flange of the rim enabling it to be attached.

Any range of values denoted by the expression "between a and b" represents the range of values extending from more than a to less than b (that is to say excluding the end-points a and b), whereas any range of values denoted by the expression "from a to b" means the range of values extending from a up to b (that is to say including the strict end-points a and b).

In preferred embodiments of the invention, the tyres are intended for passenger vehicles as defined according to the European Tyre and Rim Technical Organisation, or "ETRTO", standard of 2019. Such a tyre has a section in a meridian section plane that is characterized by a section height H and a nominal section width S, according to the European Tyre and Rim Technical Organisation, or "ETRTO", standard of 2019, that are such that the ratio H/S, expressed as a percentage, is at most equal to 90, preferably at most equal to 80 and more preferably at most equal to 70, and is at least equal to 30, preferably at least equal to 40, and the nominal section width S is at least equal to 115 mm, preferably at least equal to 155 mm and more preferably at least equal to 175 mm, and at most equal to 385 mm, preferably at most equal to 315 mm, more preferably at most equal to 285 mm and even more preferably at most equal to 255 mm. In addition, the diameter D at the rim flange, which defines the diameter of the mounting rim of the tyre, is at least equal to 12 inches, preferably at least equal to 16 inches, and at most equal to 24 inches, preferably at most equal to 20 inches.

In certain embodiments, the layer of self-sealing product comprises:
- at least one axial portion referred to as thick, and at least one axial portion referred to as thin, and/or
- at least two thick and/or thin axial portion(s) axially separated from one another by an axial portion having a zero thickness of self-sealing product, it being understood that:
  with the or each thick axial portion being axially delimited by two adjacent inflection points of the radially inner surface curve of the layer of self-sealing product, the thickness of the said thick axial portion increases in the direction axially towards the inside of the said thick axial portion from each of the said inflection points,
  with the or each thin axial portion being axially delimited by two adjacent inflection points of the radially inner surface curve of the layer of self-sealing product, the thickness of the said thin axial portion:
    decreases in the direction axially towards the inside of the said thin axial portion from each of the said inflection points, or
    decreases in the direction axially towards the inside of the said thin axial portion from one of the said inflection points and increases in the direction axially towards the inside of the said thin axial portion from the other ones of the said inflection points.

In the second alternative of these embodiments, it is possible to have two thick axial portions axially separated from one another by an axial portion having a zero thickness of self-sealing product, or else two thin axial portions axially separated from one another by an axial portion having a zero thickness of self-sealing product, or else a thick axial portion and a thin axial portion axially separated from one another by an axial portion having a zero thickness of self-sealing product.

An inflection point denotes a point at which, in a meridian section plane, the direction of the curvature of the radially inner surface curve of the layer of self-sealing product changes. It equally denotes a termination point of the radially inner surface curve of the layer of self-sealing product in contact with the airtight layer. The axial width of the or each thick axial portion is the distance in the axial direction, for example measured in a meridian section plane, between the two inflection points.

The invention makes it possible to envisage embodiments in which the layer of self-sealing product extends circumferentially in a discontinuous or continuous manner over all or part of the circumferential length of the layer of self-sealing product. With preference, and in order to ensure high effectiveness of the layer of self-sealing product against perforations, each thick and thin axial portion extends circumferentially in a continuous manner over at least 50%, preferably at least 75%, more preferably over at least 95% and ideally over 100% of the circumferential length of the layer of self-sealing product.

The invention likewise makes it possible to envisage axial portions of the layer of self-sealing product that have variable thicknesses in the circumferential direction. However, in order to maximize the gain in mass and to ensure uniform effectiveness of the layer of self-sealing product, the average thickness of each thick and thin axial portion is circumferentially substantially constant over at least 50%, preferably over at least 75% and more preferably over at least 95% of the circumferential length of the layer of self-sealing product.

In one embodiment, it is provided that the thickness of the layer of self-sealing product varies between a relatively high average thickness in line with an axial portion at high risk of perforation and an relatively low average thickness in line with an axial portion at low risk of perforation. Thus, with the layer of self-sealing product comprising L≥1 thick axial portion(s) and M≥1 thin axial portion(s), the or each thick axial portion having an average thickness EEm for m ranging from 1 to L, and the or each thin axial portion having an average thickness EMn for n ranging from 1 to M, for each value of m ranging from 1 to L and for at least 50% of the values of n ranging from 1 to M, preferably for 100% of the values of n ranging from 1 to M, EMn<EEim.

Each average thickness EE, EM of the axial portion of the layer of self-sealing product is measured by averaging the thicknesses, in multiple meridian section planes, of the layer of self-sealing product between the inflection points defining the axial ends of the said axial portion of the layer of self-sealing product, the thicknesses all being measured for example in millimetres. In the preferred case in which the average thickness is substantially constant circumferentially, a reduced number of meridian section planes will be taken. If the average thickness is not constant circumferentially, a large number of meridian section planes, for example sixteen, will be taken, and the thicknesses measured in all the meridian section planes will be averaged. The thickness measured at a point is of course the shortest straight-line distance, between the radially external surface and the radially internal surface of the layer of self-sealing product, that passes through this point. It should be noted that the sections in the meridian section planes are taken without degrading the layer of self-sealing product in order to accurately measure the various geometric variables, notably the thicknesses. Notably, use will be made of very high-pressure water jet cutting processes.

In tyres for passenger vehicles and for utility vehicles that were described above, each average thickness EE advantageously ranges from 2.0 mm to 5.0 mm, preferably from 2.5 mm to 4.5 mm, and the average thickness EM advantageously ranges from 0.5 mm to 4.0 mm, preferably from 1.0 mm to 3.0 mm.

In certain embodiments that make it possible, as indicated above, to promote the gain in mass and the effectiveness of the sealing of a possible orifice in each axial portion at high risk of perforation, for each value of m ranging from 1 to L, at least 50% of the values of n ranging from 1 to M, preferably 75% of the values of n ranging from 1 to M and more preferably 100% of the values of n ranging from 1 to M are such that EEm≥1.10×EMn, preferably EEm≥1.30× EMn and more preferably EEm≥1.50×EMn.

In other embodiments that make it possible, as indicated above, to promote the gain in mass and the effectiveness of the sealing of a possible orifice in the or each axial portion at low risk of perforation, for each value of m ranging from 1 to L, at least 50% of the values of n ranging from 1 to M, preferably 75% of the values of n ranging from 1 to M and more preferably 100% of the values of n ranging from 1 to M are such that EEm≥5.00×EMn, preferably EEm≥4.00× EMn and more preferably EEm≥2.50×EMn.

In one embodiment, the tread comprises:
- at least one circumferential cut, referred to as main circumferential cut, having a depth Ha such that Ha/Hs≥50%, preferably Ha/Hs≥75% and more preferably Ha/Hs≥90%,
- at least one rib, the thick axial portion or one of the thick axial portions is arranged at least partially in line with the or each circumferential cut,
the thin axial portion or one of the thin axial portions is arranged at least partially in line with the or each rib.

In this embodiment, the inventors responsible for the invention determined that axial portions of the tread at high risk of perforation are those that have a relatively small tread thickness. Such axial portions of the tread are those that comprise the main circumferential cuts having a depth at least equal to half of the tread pattern height. Thus, this embodiment provides that a thick axial portion of the layer of self-sealing product is arranged at least partially in line with these main circumferential cuts, thereby making it possible to ensure high effectiveness of the layer of self-sealing product against perforations that arise in the main circumferential cuts.

In order to reduce the weight of the tyre, the inventors determined that the ribs of the tyre, which have a greater tread thickness than that located radially on the inside of the main circumferential cuts, are axial portions at low risk of perforation. This is because, for the one part, the thickness of the tread protects the tyre from perforation if the perforating object is relatively short and, for the other part, a relatively great thickness of the tread resists perforation to a greater extent than a relatively small thickness does. Thus, this embodiment provides that a thin axial portion of the layer of self-sealing product is arranged at least partially in line with the ribs, thereby making it possible to significantly reduce the weight of the tyre.

That axial portion of the layer of self-sealing product that is arranged in line with a main circumferential cut or a rib of the tread is the axial portion of self-sealing product that is delimited by axial ends defined by two circumferential planes perpendicular to the axis of rotation of the tyre, each of which passes through the axial ends of the main circumferential cut or of the rib. Thus, if a thick axial portion of the layer of self-sealing product has an axial width greater than the axial width of the main circumferential cut, only part of the thick axial portion of the layer of self-sealing product is located in line with the main circumferential cut. If a thick axial portion of the layer of self-sealing product has an axial width less than the axial width of the main circumferential cut, the entirety of the thick axial portion of the layer of self-sealing product is located in line with the main circumferential cut. Similarly, if a thin axial portion of the layer of self-sealing product has an axial width greater than the axial width of the rib, only part of the thin axial portion of the layer of self-sealing product is located in line with the rib. If a thin axial portion of the layer of self-sealing product has an axial width less than the axial width of the rib, the entirety of the thin axial portion of the layer of self-sealing product is located in line with the rib.

The or each circumferential cut is referred to as main circumferential cut owing to its relatively large depth Ha in relation to other, additional circumferential cuts which could optionally be present on the tread of the tyre and which would have a relatively small depth and therefore give rise to a lower risk of perforation.

In embodiments in which the main circumferential cuts are relatively wide main circumferential grooves, notably in the case of tyres for passenger vehicles and for utility vehicles, and run a very high risk of becoming perforated and therefore for which the invention is particularly advantageous, the or each main circumferential cut has an axial width greater than or equal to 1.0 mm, preferably greater than or equal to 5.0 mm and more preferably greater than or equal to 8.0 mm, and, more preferably still, ranging from 8.0 mm to 20.0 mm.

In embodiments in which the main circumferential cuts are relatively deep, notably in the case of tyres for passenger vehicles and for utility vehicles, and run a very high risk of being perforated and therefore for which the invention is particularly advantageous, the or each main circumferential cut has a depth ranging from 4.0 mm to the tread pattern height, preferably ranging from 5.0 mm to the tread pattern height and more preferably ranging from 5.5 mm to the tread pattern height.

Advantageously, the or each rib is axially delimited by an axially inner end and by an axially outer end, each axially inner and outer end being chosen from:
an axial end of the tread, and
an axially inner or outer end of the main circumferential cut(s),
the axially inner and outer ends of the rib being ends that are adjacent to one another.

Advantageously, the layer of self-sealing product has, close to the main circumferential cut, an axial width which is significant in relation to the axial width of the main circumferential cut so as to be able to effectively seal a possible orifice. Thus, the axial width Wx of the or each thick axial portion is such that Wx/Lax≥0.50, preferably Wx/Lax>1.00, with Lax being the axial width of the main circumferential cut in line with which the said thick axial portion is at least partially arranged.

Thus, as defined above, the thick axial portion may have an axial width which is less than the axial width of the main circumferential cut, but which is still enough to make it possible to effectively seal a possible orifice. In this case, the thick axial portion coincides with a part of the axial portion of the layer of self-sealing product that extends in line with the main circumferential cut. Equally, the thick axial portion may preferably have an axial width that is greater than or equal to the axial width of the main circumferential cut. In this case, part of the thick axial portion coincides with the axial portion of the layer of self-sealing product that extends in line with the main circumferential cut.

Advantageously, Wx/Lax≥4.00, preferably Wx/Lax≥3.00, more preferably Wx/Lax≥2.00, more preferably still Wx/Lax≥1.50 and very preferably Wx/Lax≥1.25. In order not to excessively increase the weight of the tyre, it is preferable not to provide a thick axial portion which is axially excessively wide, unless that has proven to be preferable for optimizing the anti-puncture performance, notably at the shoulders of the tyre. Thus, it would be possible for the thick axial portions corresponding to the axially outermost main circumferential cuts not to satisfy the above conditions, whereas the other thick axial portions corresponding to the other main circumferential cuts could satisfy them.

In the case of a rib delimited axially by an axial end of the tread and an axially inner or outer end of a main circumferential cut, reference will generally be made to a lateral rib, since it is located in a lateral portion of the tread. In the case of a rib delimited axially by an axially inner (or outer) end of a main circumferential cut and by an adjacent axially outer (or inner) end of another main circumferential cut, reference will generally be made to a central rib, since it is located in a central portion of the tread.

The expression "adjacent ends" will be understood to mean that no axially inner or outer end of a main circumferential cut is arranged axially between the adjacent ends.

In another embodiment, the tread comprises:
at least one rib, referred to as deeply cut rib, comprising at least one transverse cut having a depth Ht such that Ht/Hs≥50%, where Hs is the tread pattern height,
at least one rib, referred to as non-cut or slightly cut rib, which lack(s) transverse cuts or comprise(s) transverse cuts, each satisfying, for at least 50%, preferably for at least 75% and more preferably for 100% of the number of transverse cuts of the or each slightly cut rib, at least one of the following conditions:
the transverse cut of the slightly cut rib has a width strictly less than 1.6 mm, preferably strictly less than 1.0 mm and more preferably strictly less than 0.7 mm,
the transverse cut of the slightly cut rib has a depth H such that H/Hs<50%, preferably H/Hs≥30%,
the thick axial portion or one of the thick axial portions is arranged at least partially in line with the deeply cut rib,
the thin axial portion or one of the thin axial portions is arranged at least partially in line with the non-cut or slightly cut rib.

The inventors responsible for the invention have determined that the axial portions of the tread at high risk of perforation are the ribs in which the deepest transverse cuts are formed. These axial portions comprise the transverse cuts having a depth at least equal to half of the tread pattern height. Thus, the invention provides that a thick axial portion of the layer of self-sealing product is arranged at least partially in line with these deeply cut ribs, thereby making it possible to ensure high effectiveness of the layer of self-sealing product against perforations that arise in these deeply cut ribs.

In order to reduce the weight of the tyre, the inventors have determined that the weakly or slightly cut ribs are axial portions at low risk of perforation. This is because, in the case of a non-cut rib, a relatively great thickness of the tread resists perforation to a greater extent than a relatively small thickness does. In the case of a slightly cut rib comprising shallow transverse cuts, for the one part, the thickness of the tread protects the tyre from perforation if the perforating object is relatively short and, for the other part, a relatively great thickness of the tread resists perforation to a greater extent than a relatively small thickness does. In addition, in the case of a slightly cut rib comprising narrow transverse cuts, the probability of a perforating object becoming lodged therein is relatively low. Thus, the invention provides that a thin axial portion of the layer of self-sealing product is arranged at least partially in line with the non-cut or slightly cut ribs, thereby making it possible to significantly reduce the weight of the tyre.

In embodiments in which the transverse cuts of the or each deeply cut rib are relatively wide, notably in the case of tyres for passenger vehicles and for utility vehicles, and run a high risk of being perforated, and therefore in which the invention is particularly advantageous, the or each transverse cut of the or each deeply cut rib has a width greater than or equal to 0.7 mm, preferably greater than or equal to 1.0 mm and more preferably greater than or equal to 1.6 mm.

In embodiments in which the transverse cuts of the or each deeply cut rib are relatively deep, notably in the case of tyres for passenger vehicles and for utility vehicles, and run a high risk of being perforated, and therefore in which the invention is particularly advantageous, the or each transverse cut of the or each deeply cut rib has a depth ranging from 2.0 mm to the tread pattern height, preferably ranging from 4.0 mm to the tread pattern height and more preferably ranging from 5.0 mm to the tread pattern height.

Advantageously, each deeply cut rib and each non-cut or slightly cut rib is axially delimited by an axially inner end and by an axially outer end, each axially inner and outer end being chosen from:
- an axial end of the tread, and
- an axially inner or outer end of a circumferential cut, referred to as main circumferential cut, having a depth Ha such that Ha/Hs≥50%, preferably Ha/Hs≥75% and more preferably Ha/Hs≥90%, the axially inner and outer ends of the rib being ends that are adjacent to one another.

In the case of a rib delimited axially by an axial end of the tread and an axially inner or outer end of a main circumferential cut, reference will generally be made to a lateral rib, since it is located in a lateral portion of the tread. In the case of a rib delimited axially by an axially inner (or outer) end of a main circumferential cut and by an adjacent axially outer (or inner) end of another main circumferential cut, reference will generally be made to a central rib, since it is located in a central portion of the tread.

The expression "adjacent ends" will be understood to mean that no axially inner or outer end of a main circumferential cut is arranged axially between the adjacent ends.

Advantageously, the layer of self-sealing product has, close to the deeply cut rib, an axial width which is significant in relation to the axial width of each deeply cut rib so as to be able to effectively seal a possible orifice. Thus, the axial width Wy of the or each thick axial portion is such that Wy/Lcy≥0.50, preferably Wy/Lcy>1.00, with Lcy being the axial width of the deeply cut rib in line with which the said thick axial portion is at least partially arranged.

Thus, as defined above, the thick axial portion may have an axial width which is less than the axial width of the deeply cut rib, but which is still enough to make it possible to effectively seal a possible orifice. In this case, the thick axial portion coincides with a part of the axial portion of the layer of self-sealing product that extends in line with the deeply cut rib. Equally, the thick axial portion may preferably have an axial width that is greater than or equal to the axial width of the deeply cut rib. In this case, part of the thick axial portion coincides with the axial portion of the layer of self-sealing product that extends in line with the deeply cut rib.

In order to maximize the effectiveness of the layer of self-sealing product over the vast majority of the axial width of the tread, each axially outer end of the layer of self-sealing product is arranged at an axial distance less than or equal to 20%, preferably less than or equal to 10% of the width of the tread in relation to respectively each end of the tread, preferably axially on the inside of each axial end of the tread.

In the conventional way, the tyre comprises a crown, two sidewalls, and two beads, each sidewall connecting each bead to the crown. Again in the conventional way, the crown comprises the tread and a crown reinforcement arranged radially on the inside of the tread. The tyre also comprises a carcass reinforcement that is anchored in each bead and extends radially in each sidewall and axially in the crown, radially on the inside of the crown reinforcement.

In the conventional way, the crown reinforcement comprises at least one crown layer containing reinforcing elements. These reinforcing elements are preferably textile or metallic filamentary elements.

In embodiments that make it possible to obtain performance aspects of tyres known as radial tyres as defined by the ETRTO, the carcass reinforcement comprises at least one carcass layer, the or each carcass layer comprising carcass filamentary reinforcing elements, each carcass filamentary reinforcing element extending substantially along a main direction that forms an angle, in terms of absolute value ranging from 80° to 90°, with the circumferential direction of the tyre.

BRIEF DESCRIPTION OF THE FIGURES

The invention will be understood better on reading the following description, which is given purely by way of non-limiting example and with reference to the drawings, in which.

DETAILED DESCRIPTION

A frame of reference X, Y, Z corresponding to the usual axial (Y), radial (Z) and circumferential (X) directions, respectively, of a tyre is shown in the figures relating to the tyre.

In the following description, the measurements taken are taken on an unladen and non-inflated tyre or on a section of a tyre in a meridian plane.

Figure 1:
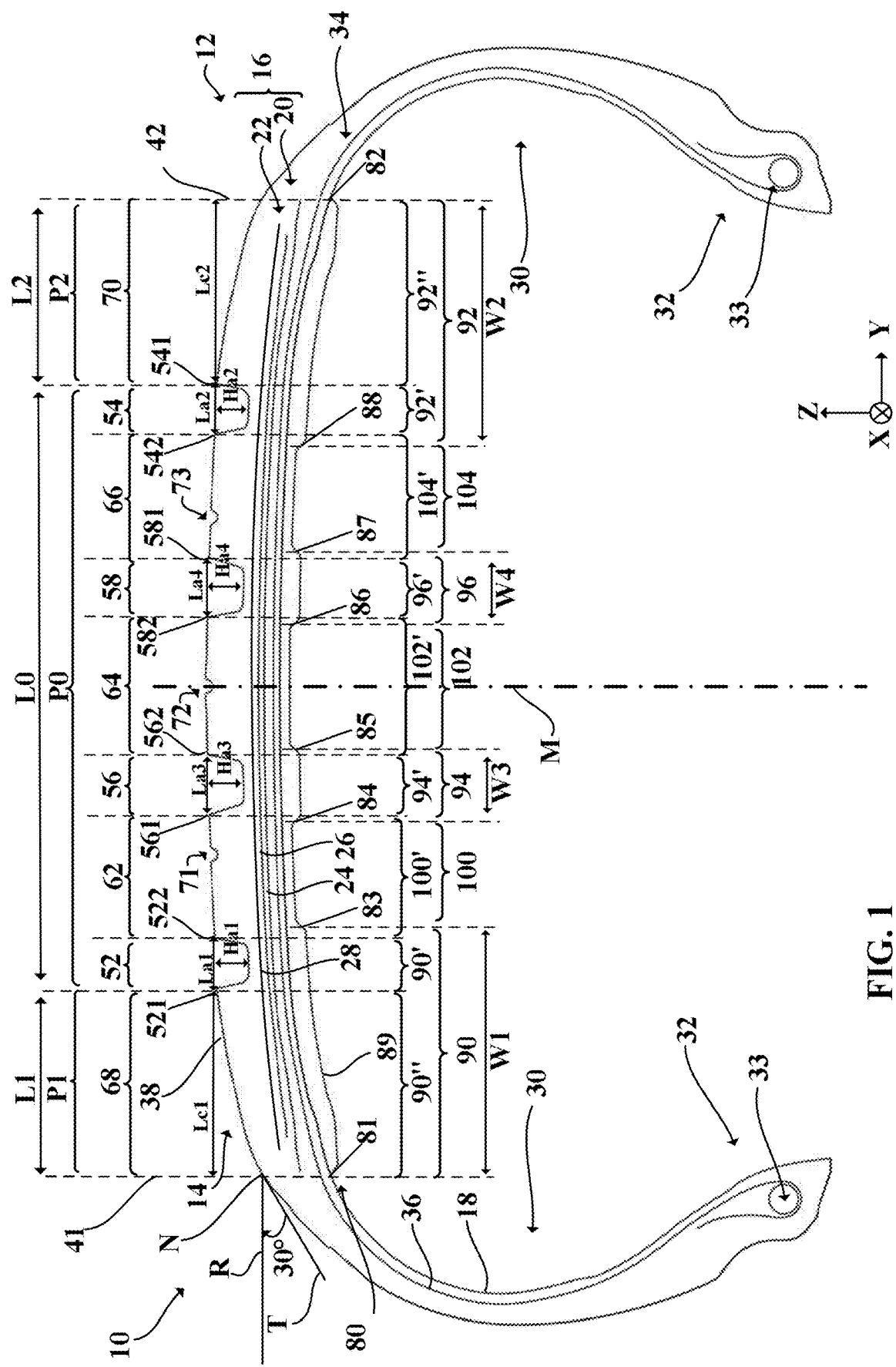
FIG. 1 is a view, in a meridian section plane parallel to the axis of rotation of the tyre, of a tyre according to a first embodiment of the invention.

FIG. 1 shows a tyre according to the invention and denoted by the general reference 10. The tyre 10 has a substantially toric shape about an axis of revolution substantially parallel to the axial direction Y. The tyre 10 is intended for a passenger vehicle and has the size 245/45 R18. In the various figures, the tyre 10 is depicted as new, which is to say when it has not yet been run.

The tyre 10 comprises a crown 12 comprising a tread 14 intended to come into contact with the ground when it is running and a crown reinforcement 16 extending in the crown 12 in the circumferential direction X. The tyre 10 also comprises a layer 18 that is airtight with respect to an inflation gas and is intended to delimit an internal cavity closed with a mounting support for the tyre 10 once the tyre 10 has been mounted on the mounting support, for example a rim.

The crown reinforcement 16 comprises a working reinforcement 20 and a hoop reinforcement 22. The working reinforcement 16 comprises at least one working layer and in this case comprises two working layers comprising a radially inner working layer 24 arranged radially on the inside of a radially outer working layer 26.

The hoop reinforcement 22 comprises at least one hooping layer and in this case comprises one hooping layer 28.

The crown reinforcement 16 is surmounted radially by the tread 14. In this case, the hoop reinforcement 22, in this case the hooping layer 28, is arranged radially on the outside of the working reinforcement 20 and is therefore interposed radially between the working reinforcement 20 and the tread 14.

The tyre 10 comprises two sidewalls 30 that extend the crown 12 radially inwards. The tyre 10 also has two beads 32 radially on the inside of the sidewalls 30. Each sidewall 30 connects each bead 32 to the crown 12.

The tyre 10 comprises a carcass reinforcement 34 that is anchored in each bead 32 and, in this instance, is wrapped around a bead wire 33. The carcass reinforcement 34 extends radially in each sidewall 30 and axially in the crown 12, radially on the inside of the crown reinforcement 16. The crown reinforcement 16 is arranged radially between the tread 14 and the carcass reinforcement 34. The carcass reinforcement 34 comprises at least one carcass layer 36.

Each working layer 24, 26, hooping layer 28 and carcass layer 36 comprises an elastomer matrix in which one or more filamentary reinforcing elements of the corresponding layer are embedded.

The hoop reinforcement 22, in this case the hooping layer 28, comprises one or more hooping filamentary reinforcing elements that are wrapped circumferentially helically in a main direction and form an angle AF which, in terms of absolute value, is less than or equal to 10°, preferably less than or equal to 7° and more preferably less than or equal to 5° with the circumferential direction X of the tyre 10. In this case, AF=−5°.

Each radially inner working layer 24 and radially outer working layer 26 comprises working filamentary reinforcing elements extending in main directions and forming oppositely oriented angles AT1 and AT2, respectively, which, in terms of absolute value, are strictly greater than 10°, preferably ranging from 15° to 50° and more preferably ranging from 15° to 30° with the circumferential direction X of the tyre 10. In this case, AT1=−26° and AT2=+26°.

The carcass layer 36 comprises carcass filamentary reinforcing elements extending in a main direction D3 forming an angle AC which, in terms of absolute value, is greater than or equal to 60°, preferably ranging from 80° to 90° and in this case AC=+90°, with the circumferential direction X of the tyre 10.

Each hooping filamentary reinforcing element conventionally comprises two multifilament plies, each multifilament ply being made up of a spun yarn of aliphatic polyamide, in this instance nylon, monofilaments, with a thread count equal to 140 tex, these two multifilament plies being twisted in a helix individually at 250 turns per metre in one direction and then twisted together in a helix at 250 turns per metre in the opposite direction. These two multifilament plies are wound in a helix around one another. As a variant, use could be made of a hooping filamentary reinforcing element comprising one multifilament ply made up of a spun yarn of aliphatic polyamide, in this case nylon, monofilaments with a thread count equal to 140 tex, and one multifilament ply made up of a spun yarn of aromatic polyamide, in this case aramid, monofilaments with a thread count equal to 167 tex, these two multifilament plies being twisted in a helix individually at 290 turns per metre in one direction and then twisted together in a helix at 290 turns per metre in the opposite direction. These two multifilament plies are wound in a helix around one another. This variant will give AT1=−29° and AT2=+29°.

Each working filamentary reinforcing element is an assembly of two steel monofilaments wound in a helix at a pitch of 14 mm, each steel monofilament having a diameter equal to 0.30 mm. As a variant, use could also be made of an assembly of six steel monofilaments having a diameter equal to 0.23 mm and comprising an inner layer of two monofilaments wound together in a helix at a pitch of 12.5 mm in a first direction, for example the Z direction, and an outer layer of four monofilaments wound together in a helix around the inner layer at a pitch of 12.5 mm in a second direction opposite to the first direction, for example the S direction. In another variant, each working filamentary reinforcing element is made up of one steel monofilament having a diameter equal to 0.30 mm. More generally, the steel monofilaments have diameters ranging from 0.25 mm to 0.32 mm.

Each carcass filamentary reinforcing element conventionally comprises two multifilament plies, each multifilament ply being made up of a spun yarn of polyester, in this case PET, monofilaments, these two multifilament plies being twisted in a helix individually at 240 turns per metre in one direction and then twisted together in a helix at 240 turns per metre in the opposite direction. Each of these multifilament plies has a thread count equal to 220 tex. In other variants, use could be made of thread counts equal to 144 tex and twists equal to 420 turns per metre or thread counts equal to 334 tex and twists equal to 270 turns per metre.

Figure 2:
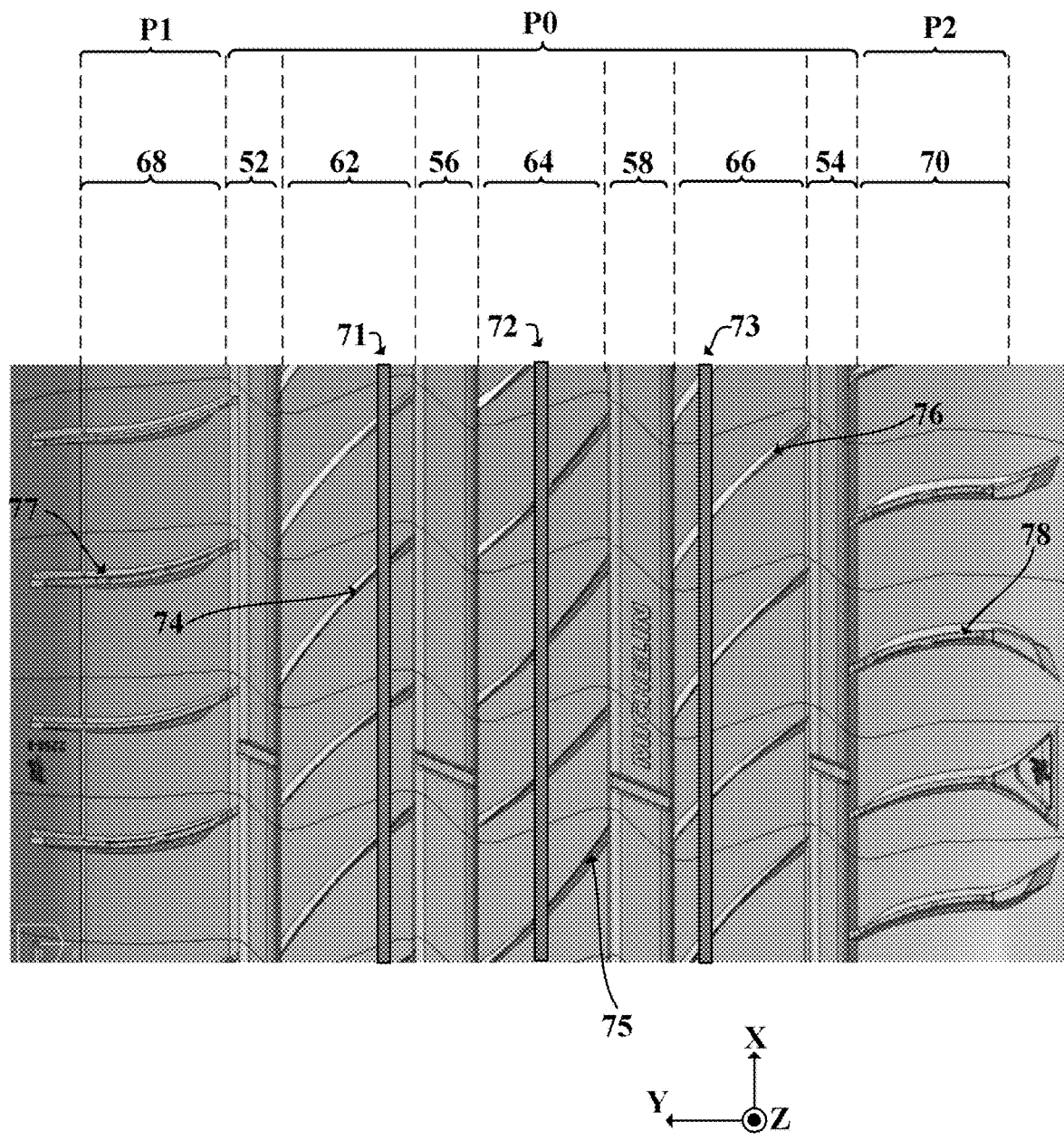
FIG. 2 is a top view of the tread of the tyre of FIG. 1.

With reference to FIGS. 1 and 2, the tread 14 comprises a tread surface 38 by means of which the tread 14 comes into contact with the ground. The tread surface 38 is intended to come into contact with the ground when the tyre 10 is running on the ground. The tread is axially delimited by first and second axial edges 41, 42 passing through each point N arranged on each side of the median plane M and for which the angle between the tangent T to the tread surface 38 and a straight line R parallel to the axial direction Y passing through this point is equal to 30°.

The tread 14 comprises an axially central portion P0 and first and second axially lateral portions P1, P2 arranged axially on the outside of the axially central portion P0 axially one on each side of the axially central portion P0 in relation to the median plane M of the tyre 10.

Without it being specific to the embodiment illustrated, the axially central portion P0 has an axial width L0 greater than or equal to 50%, preferably greater than or equal to 60%, and less than or equal to 80%, preferably less than or equal to 70% of the axial width L of the tread surface 38 of the tyre 10 when new. Each first and second axially lateral portion P1, P2 has an axial width L1, L2 less than or equal to 25%, preferably less than or equal to 20%, and greater than or equal to 5%, preferably greater than or equal to 10% of the axial width L of the tread surface 38 of the tyre 10 when new. The ratio of the axial width L0 of the central portion P0 to the axial width L1, L2 of each first and second axially lateral portion P1, P2 is greater than or equal to 3.0, preferably ranges from 3.0 to 5.0 and more preferably ranges from 4.0 to 4.5. In this case, L0=140 mm, L1=L2=33 mm.

The axially central portion P0 comprises N>1 main circumferential cuts, in this case N main circumferential grooves, comprising first, second, third and fourth main circumferential cuts denoted by the references 52, 54, 56, 58, respectively. The first and second main circumferential cuts 52, 54 are arranged axially one on each side of the median plane M of the tyre 10 and are the axially outermost main circumferential cuts of the tread 14.

Each main circumferential cut 52 to 58 is axially delimited by an axially outer end denoted by the reference 521, 541, 561, 581, respectively, and by an axially inner end denoted by the reference 522, 542, 562, 582, respectively. The axially central portion P0 extends axially from the axially outer end 521 of the first main circumferential cut 52 as far as the axially outer end 541 of the second main circumferential cut 54.

Each main circumferential cut 52 to 58 has a depth that is denoted by the reference Ha1, Ha2, Ha3, Ha4, respectively, and ranges from 4.0 mm to the tread pattern height Hs, preferably ranging from 5.0 mm to the tread pattern height Hs and more preferably ranging from 5.5 mm to the tread pattern height Hs. Each depth Ha1, Ha2, Ha3, Ha4 is greater than or equal to 50% of the tread pattern height Hs. In this case, Hs=Ha3=Ha4=6.5 mm and Ha1=Ha2=6.0 mm. Thus, each main circumferential cut 52, 54, 56, 58 is such that Hai/Hs≥75% and in this case such that Hai/Hs≥90%, with i ranging from 1 to 4, since Hs=6.5 mm.

Each main circumferential cut 52 to 58 has an axial width that is denoted by the reference La1, La2, La3, La4, respectively, and is greater than or equal to 1.0 mm, preferably greater than or equal to 5.0 mm and more preferably greater than or equal to 8.0 mm and, more preferably still, ranging from 8.0 mm to 20.0 mm. In this case, La1=La2=10.0 mm and La3=La4=12.5 mm.

The axially central portion P0 comprises Q=N−1≥1 central ribs, in this case first, second and third central ribs, denoted by the references 62, 64, 66, respectively. Each central rib 62, 64, 66 is arranged axially between two of the adjacent main circumferential cuts 52 to 58 and is axially delimited by two adjacent main circumferential cuts 52 to 58.

Each central rib 62, 64, 66 is axially delimited by an axially inner end and by an axially outer end, each axially inner and outer end being an axially inner or outer end of the main circumferential cuts 52 to 58. The axially inner and outer ends of each central rib 62, 64, 66 are adjacent to one another. In this specific case, the first central rib 62 is axially delimited by the axially inner end 522 of the first main circumferential cut 52 and by the axially outer end 561 of the third main circumferential cut 56. The second central rib 64 is axially delimited by the axially inner end 562 of the third main circumferential cut 56 and by the axially inner end 582 of the fourth main circumferential cut 58. The third central rib 66 is axially delimited by the axially outer end 581 of the fourth main circumferential cut 58 and by the axially inner end 542 of the second main circumferential cut 54.

The axially central portion P0 comprises additional circumferential cuts formed in the central ribs 62, 64, 66. In this case, each central rib 62, 64, 66 comprises an additional circumferential cut 71, 72, 73, respectively. Each additional circumferential cut 71, 72, 73 has a depth strictly less than 50% of the tread pattern height Hs, preferably less than or equal to 30% of the tread pattern height Hs and more preferably ranging from 10% to 30% of the tread pattern height Hs and in this case ranging from 1.0 mm to 4.0 mm and in this case equal to 2.0 mm. Each additional circumferential cut 71, 72, 73 has a respective axial width ranging from 4% to 15%, preferably from 4% to 10% respectively of each axial width of each central rib 62, 64, 66 and in this case less than or equal to 3.0 mm, preferably ranging from 1.0 mm to 3.0 mm and in this case equal to 1.0 mm.

Moreover, each central rib 62, 64, 66 comprises transverse cuts 74, 75, 76 satisfying for at least 50%, preferably for at least 75% and more preferably for 100% of the number of transverse cuts 74, 75, 76 of each central rib 62, 64, 66, at least one of the following conditions:
 the transverse cut of the central rib has a width strictly less than 1.6 mm, preferably strictly less than 1.0 mm and more preferably strictly less than 0.7 mm,
 the transverse cut of the central rib has a depth H such that H/Hs<50%, preferably H/Hs≤30%.

In this specific case, each central rib 62, 64, 66 comprises transverse cuts 74, 75, 76 satisfying, for 100% of the number of transverse cuts 74, 75, 76 of each central rib 62, 64, 66, the condition according to which each transverse cut 74, 75, 76 has a width strictly less than 0.7 mm. In this regard, each central rib 62, 64, 66 is referred to as slightly cut. The first axially lateral portion P1 extends axially from the first axial end 41 of the tread 14 as far as the axially outer end 521 of the first main circumferential cut 52. The second axially lateral portion P2 extends axially from the second axial end 42 of the tread 14 as far as the axially outer end 541 of the second main circumferential cut 54.

Each first and second axially lateral portion P1, P2 respectively comprises a first and a second lateral rib denoted by the references 68, 70, respectively, and in this instance is respectively made up of each first and second lateral rib 68, 70. The tyre 10 thus comprises P=2>1 lateral ribs. Thus, the first lateral rib 68 is axially delimited by two mutually adjacent ends, in this instance by the axial end 41 of the tread 14 and the axially outer end 521 of the first main circumferential cut 52. The second lateral rib 70 is axially delimited by two mutually adjacent ends, in this instance by the axial end 42 of the tread 14 and the axially outer end 541 of the second main circumferential cut 54. Each first and second lateral rib 68, 70 has an axial width denoted by the reference Lc1, Lc2, respectively, with Lc1=Lc2=33 mm holding true here.

Each first and second lateral rib 68, 70 comprises transverse cuts 77, 78 having a depth Ht such that Ht/Hs≥50%, preferably Ht/Hs≥75% and preferably Ht/Hs≥90%. Each transverse cut 77, 78 has a depth Ht ranging from 2.0 mm to the tread pattern height Hs, preferably ranging from 4.0 mm to the tread pattern height Hs and, more preferably still, ranging from 5.0 mm to the tread pattern height Hs, and in this case Ht=6.0 mm. Each transverse cut 77, 78 has a width greater than or equal to 0.7 mm, preferably greater than or equal to 1.0 mm and more preferably greater than or equal to 1.6 mm. In this regard, each lateral rib 68, 70 is referred to as deeply cut.

With reference to FIG. 1, the tyre 10 also comprises a layer 80 of a self-sealing product extending circumferentially radially on the inside of part of the airtight internal layer 18 and at least partially in line with the tread 14. The self-sealing product is known from the prior art and can be chosen notably from among the products described in documents WO2020009849, WO2011092122 and WO2011092123. The layer of self-sealing product is axially delimited by two axial ends 81, 82 arranged respectively at an axial distance less than or equal to 20%, preferably less than or equal to 10% of the axial width of the tread in relation to each axial end 41, 42, respectively, of the tread 14. In this instance, each axial end 81, 82 is radially aligned with each end 41, 42, respectively, even though preference will be given to the embodiments in which each axial end 81, 82 is arranged axially on the inside of each axial end 81, 82.

The layer of self-sealing product 80 comprises L≥1, in this instance L=4>1 axial portions referred to as thick axial portions and in this case denoted by the references 90, 92, 94, 96, and also M≥1, in this instance M=3>1 axial portions referred to as thin axial portions and in this case denoted by the references 100, 102, 104. As illustrated in FIG. 1, each thick and thin axial portion is delimited by two inflection points 81, 82, 83, 84, 85, 86, 87, 88 on the radially inner surface curve 89 of the layer of self-sealing product. Each thick axial portion 90 to 96 is axially delimited by two adjacent inflection points such that the thickness of each thick axial portion 90 to 96 increases in the direction axially towards the inside of each thick axial portion 90 to 96 from each of the said inflection points. Each thin axial portion 100 to 104 is axially delimited by two adjacent inflection points such that the thickness of each thin axial portion 100 to 104 decreases in the direction axially towards the inside of the said thin axial portion 100 to 104 from each of the said inflection points.

Each thick axial portion 90 to 96 and thin axial portion 100 to 104 extends circumferentially continuously over at least 50%, preferably at least 75% and more preferably over at least 95% and in the present case over 100% of the circumferential length of the layer of self-sealing product 80. The average thickness EE1, EE2, EE3, EE4 of each thick axial portion 90, 92, 94, 96, respectively, and the average thickness EM1, EM2, EM3 of each thin axial portion 100, 102, 104, respectively, is circumferentially substantially constant over at least 50%, preferably over at least 75% and more preferably over at least 95% and in the present case over 100% of the circumferential length of the layer of self-sealing product 80. In this instance, EE1=EE2=EE3=EE4=3.45 mm and EM1=EM2=EM3=1.95 mm.

Each thick axial portion 90, 92, 94, 96 comprises an axial portion 90', 92', 94', 96', respectively, extending axially in line with each main circumferential cut 52, 54, 56, 58, respectively. The layer of self-sealing product 80 thus comprises N=4 axial portions 90' to 96' extending axially in line with one of the N main circumferential cuts 52 to 58. Each axial portion 90' to 96' has an average thickness Eai>0 of self-sealing product, with i ranging from 1 to 4. In this instance, Ea1=Ea2=Ea3=Ea4=3.50 mm.

Each thick axial portion 90, 92 also comprises an axial portion 90", 92", respectively, extending axially in line with the first and the second lateral rib 68, 70. Each portion 90", 92" has an average thickness Ec1>0, Ec2>0, respectively. In this instance, Ec1=Ec2=3.50 mm.

Each thin axial portion 100, 102, 104 comprises an axial portion 100', 102', 104', respectively, extending axially in line with each central rib 62, 64, 66, respectively. The layer of self-sealing product 80 thus comprises Q=N−1=3 axial portions 100', 102', 104' extending axially in line with one of the Q central ribs 62, 64, 66. Each axial portion 100', 102', 104' is arranged axially between two adjacent axial portions 90' to 96'. Each axial portion 100', 102', 104' has an average thickness Ebj≥0 of self-sealing product, with j ranging from 1 to 3. In this instance, Eb1=Eb2=Eb3=2.00 mm.

It should be noted that, for each value of i ranging from 1 to N, at least 50% of the values of j ranging from 1 to Q, preferably 75% of the values of j ranging from 1 to Q and in this case 100% of the values of j ranging from 1 to Q are such that Ebj<Eai, Ebj<Ec1 and Ebj<Ec2.

It should also be noted that, for each value of i ranging from 1 to N, at least 50% of the values of j ranging from 1 to Q, preferably 75% of the values of j ranging from 1 to Q and in this case for 100% of the values of j ranging from 1 to Q are such that, on the one hand, Eai≥1.10×Ebj, preferably Eai≥1.30×Ebj and more preferably Eai≥1.50×Ebj and, on the other hand, Eai≥5.00×Ebj, preferably Eai≥4.00×Ebj and more preferably Eai≥2.50×Ebj. In this case, for each value of i ranging from 1 to N, 100% of the values of j ranging from 1 to Q are such that Eai/Ebj=1.75.

It should also be noted that at least 50% of the values of j ranging from 1 to Q, preferably 75% of the values of j ranging from 1 to Q and in this case 100% of the values of j ranging from 1 to Q are such that, on the one hand, Ec1≥1.10×Ebj and Ec2≥1.10×Ebj, preferably Ec1≥1.30×Ebj and Ec2≥1.30×Ebj and more preferably Ec1≥1.50×Ebj and Ec2≥1.50×Ebj and, on the other hand, Ec1≤5.00×Ebj and Ec2≤5.00×Ebj, preferably Ec1≤4.00×Ebj and Ec2≤4.00×Ebj and more preferably Ec1≤2.50×Ebj and Ec2≤2.50×Ebj. In this case, 100% of the values of j ranging from 1 to Q are such that Ec1/Ebj=1.75 and Ec2/Ebj=1.75.

Each thick axial portion 90, 92, 94, 96 at least partially coincides with all or part of each axial portion 90', 92', 94', 96', respectively. In this instance, as can be seen in FIG. 1, each thick axial portion 90, 92, 94, 96 has an axial width greater than or equal to the axial width of each main circumferential cut 52, 54, 56, 58, respectively. Thus, each thick axial portion 94, 96 has an axial width W3, W4, respectively, such that, on the one hand, W3/La3≥0.50 and W4/La4>0.50, preferably W3/La3>1.00 and W4/La4>1.00, and, on the other hand, W3/La3≤4.00 and W4/La4≤4.00, preferably W3/La3≤3.00 and W4/La4≤3.00, more preferably W3/La3≤2.00 and W4/La4≤2.00, more preferably still W3/La3≤1.50 and W4/La4≤1.50 and very preferably W3/La3≤1.25 and W4/La4<1.25. In this instance, W3=W4=13.5 mm, such that W3/La3=W4/La4=1.08.

Moreover, each thick axial portion 90, 92 at least partially coincides with all or part of each axial portion 90", 92". In this instance, as can be seen in FIG. 1, each thick axial portion 90, 92 has an axial width greater than or equal to the axial width of each main circumferential cut 90", 92", respectively. Thus, each thick axial portion 90, 92 has an axial width W1, W2, respectively, such that, on the one hand, W1/Lc1≥0.50 and W2/Lc2≥0.50, preferably W1/Lc1>1.00 and W2/Lc2>1.00. In this instance, W1=W2=44 mm, such that W1/Lc1=W2/Lc2=1.33.

Moreover, it holds true that W1/La1≥0.50 and W2/La2≥0.50, preferably W1/La1>1.00 and W2/La222 1.00 and in this case W1/La1=W2/La2=4.40.

All of the conditions satisfied by the various axial portions 90 to 96, 90' to 96', 90", 92", 100 to 104 and 100' to 104' are satisfied over at least 50%, preferably over at least 75% and more preferably over at least 95% and in the present case over 100% of the circumferential length of the layer of self-sealing product 80.

Each axial portion 90' to 96', 90", 92" and 100' to 104' of the layer of self-sealing product extending in line with each cut 52 to 58 and with each rib 62 to 70 extends circumferentially continuously over at least 50%, preferably over at least 75% and more preferably over at least 95% and in the present case over 100% of the circumferential length of the layer of self-sealing product 80.

The average thickness Ea1 to Ea4, Ec1, Ec2 and Eb1 to Eb3 of each axial portion to 96', 90", 92" and 100' to 104' is circumferentially substantially constant over at least 50%, preferably over at least 75% and more preferably over at least 95% and in the present case over 100% of the circumferential length of the layer of self-sealing product 80.

Figure 3:
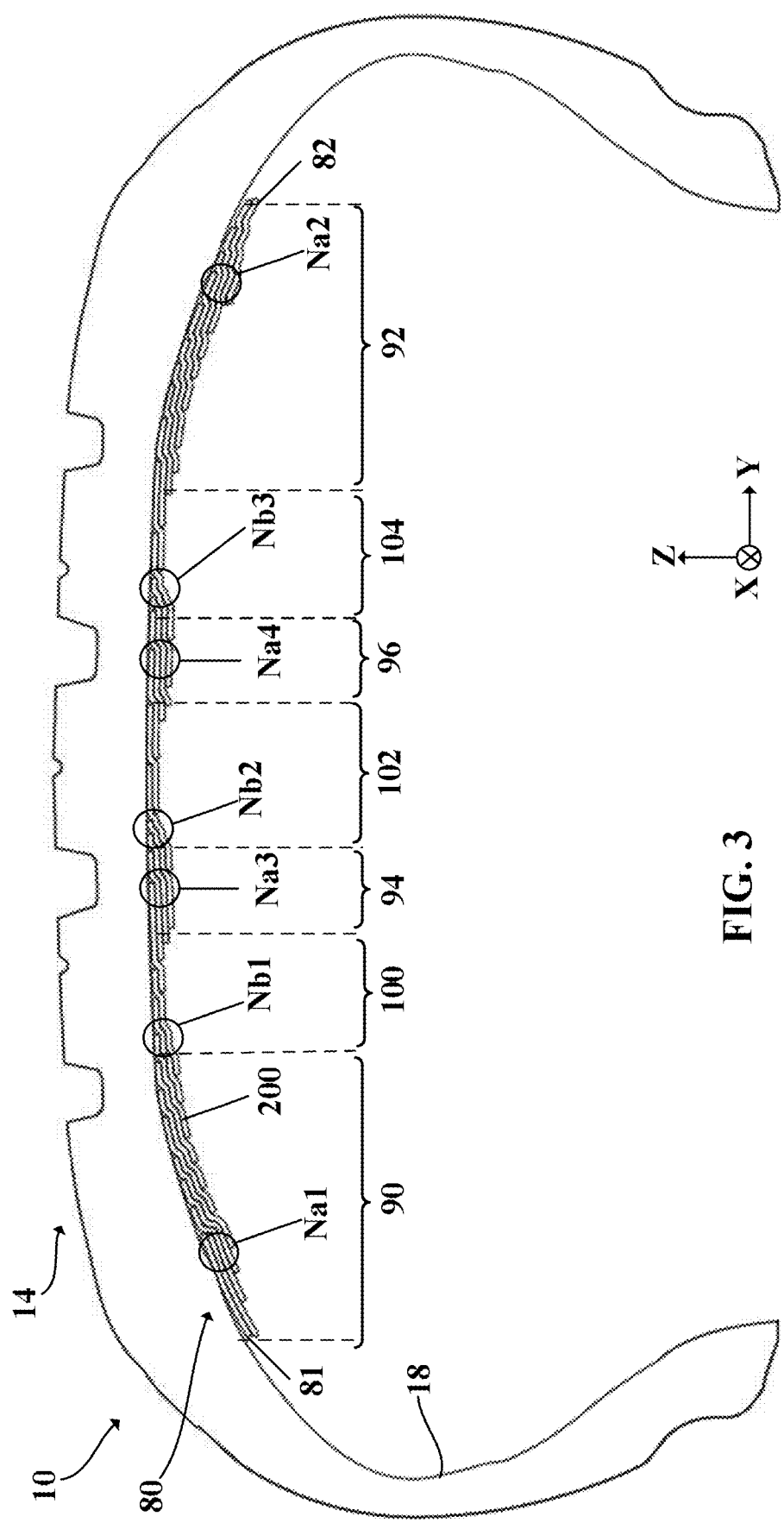
FIG. 3 is a view, in a meridian section plane parallel to the axis of rotation of the tyre, illustrating the method for manufacturing the tyre of FIG. 1.

A method for manufacturing the tyre 10 will now be described with reference to FIG. 3.

A new tyre in its vulcanized state without a layer of self-sealing product 80 is provided.

An extrusion device and a device for applying a strip 200 of self-sealing product having a width equal to 15 mm and a thickness equal to 0.9 mm are provided. Such devices are described notably in WO2015/173120. As a variant, it is possible to use a bead of self-sealing product.

The strip 200 of self-sealing product is wound through multiple circumferential turns, in this instance through 33 circumferential turns, radially on the inside of the airtight layer 18 of the tyre. This winding step is carried out according to a law for winding the strip 200, the result of which is illustrated in FIG. 3.

The winding of the strip 200 is started from the axial end 81 and the winding of the strip 200 is stopped when the axial end 82 is reached. The strip 200 is wound without interrupting the strip 200 between the two axial ends 81, 82.

During the winding step, the strip 200 is wound on itself through Nai>1 radially superposed circumferential turns over each thick axial portion 90, 92, 94, 96 of the layer of self-sealing product 80, with i ranging from 1 to 4. The strip 200 is wound on itself through Nbj>1 circumferential turns radially superposed on each thin axial portion 100, 102, 104 of the layer of self-sealing product 80, with j ranging from 1 to M. For any value of i ranging from 1 to L, at least 50% of the values of j ranging from 1 to M, preferably 75% of the values of j ranging from 1 to M and in this case 100% of the values of j ranging from 1 to M are such that Nbj<Nai. In this specific case, it holds true that Na1=Na2=5 for each thick axial portion 90 and 92, Na3=Na4=4 for each thick axial portion 94, 96, and Nb1=Nb2=Nb3=3 for each thin axial portion 100, 102, 104.

It should be noted that, for each value of i ranging from 1 to L, at least 50% of the values of j ranging from 1 to M, preferably 75% of the values of j ranging from 1 to M and more preferably and in this case 100% of the values of j ranging from 1 to M are such that, on the one hand, Nai/Nbj≥1.20 and, on the other hand, Nai/Nbj≤3.00, preferably Nai/Nbj≤2.75 and more preferably Nai/Nbj≤2.50.

To perform this winding step, the winding law includes multiple parameters for axially varying the thickness of the layer of self-sealing product 80. These parameters include a winding pitch of the strip 200, a winding speed of the strip 200 in relation to a device for applying the strip 200, an axial movement speed of the tyre 10 in relation to a device for applying the strip 200 in the tyre 10, an extrusion rate of a device for extruding the strip 200, a width of the strip 200 or else a thickness of the strip 200. It is possible to choose to vary just one of these parameters or else multiple parameters at the same time. Advantageously, in this case solely the winding pitch of the strip 200 has been varied in order to axially vary the thickness of the layer of self-sealing product 80 over at least 50%, preferably over at least 75%, more preferably over at least 95% and in this case over 100% of the circumferential length of the layer of self-sealing product 80 and to obtain the layer illustrated in FIG. 3.

Figure 4:
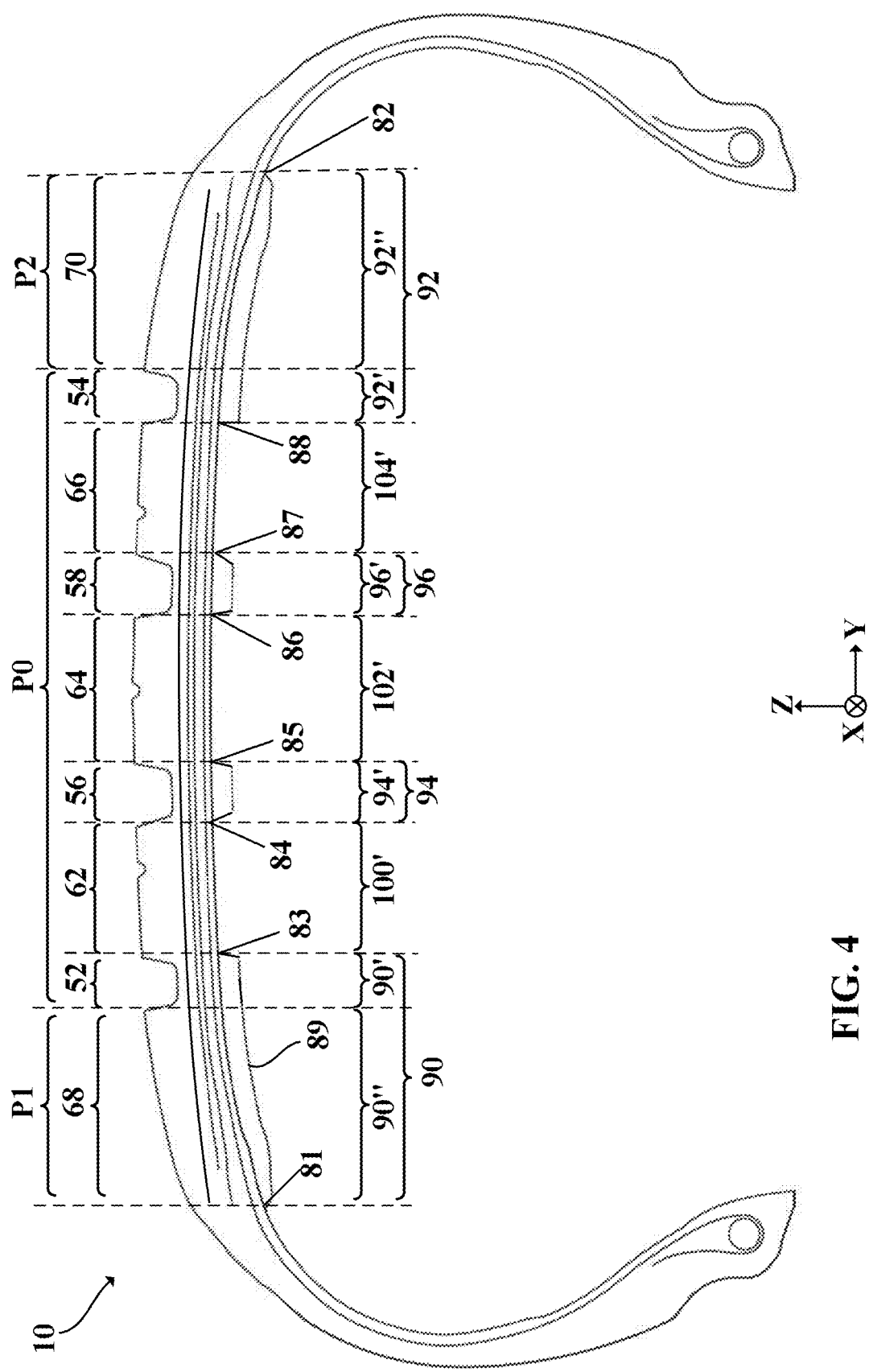
FIG. 4 is a view, similar to the one in FIG. 1, of a tyre according to a second embodiment of the invention.

A tyre according to a second embodiment of the invention will now be described with reference to FIG. 4. Elements similar to those of the first embodiment are denoted by identical references.

In comparison with the tyre according to the first embodiment, each thick axial portion 90 to 96 completely coincides with part of each axial portion 90' to 96', respectively, extending axially in line with each main circumferential cut 52 to 58, respectively.

Moreover, the layer of self-sealing product does not comprise any thin axial portion 100, 102, 104. Thus, each axial portion 100', 102', 104' extending axially in line with each central rib 62, 64, 66, respectively, has a self-sealing product thickness of zero. Each axial portion 100', 102', 104' is arranged axially between two of the axially adjacent axial portions 90' to 96' and also axially between the two axial portions 90'' and 92''.

During the method for manufacturing the tyre 10 according to the second embodiment, it is no longer the pitch at which the strip is laid but the thickness of the strip 200, which is substantially zero between the axially adjacent axial portions 90' to 96', that is varied. Thus, the strip 200 is wound with interruption of the strip 200, in this case three times, between the two axial ends 81, 82.

The invention is not limited to the embodiments described above.

Specifically, it is also possible to envisage an embodiment in which each central rib 62, 64, 66 lacks any transverse cut. In this case, it could be said that each central rib 62, 64, 66 is not cut.

The invention claimed is:

1. A method for manufacturing a tire comprising a tread, an airtight internal layer, and at least one layer of a self-sealing product extending circumferentially radially on an inside of part of the airtight internal layer, the method comprising:
   winding a strip or a bead of a self-sealing product through multiple circumferential turns radially on an inside of the airtight internal layer of the tire, which does not include the layer of self-sealing product yet, and at least partially in line with the tread, the winding the strip or the bead being carried out according to a winding law for winding circumferential turns of the strip or of the bead,
   wherein, while winding the strip or the bead of self-sealing product, one or more parameters of the winding law making it possible to axially vary a thickness of the layer of self-sealing product are varied over at least 50% of a circumferential length of the layer of self-sealing product,
   wherein the strip or the bead is wound on itself through Nai>1 radially superposed circumferential turns over L≥1 axial portions of the layer of self-sealing product, with i ranging from 1 to L, and
   wherein the strip or the bead is wound on itself through Nbj>1 radially superposed circumferential turns or the strip or the bead is wound through Nbj=1 circumferential turn over M≥1 axial portions of the layer of self-sealing product, with j ranging from 1 to M.

2. The method according to claim 1, wherein, while winding the strip or the bead of self-sealing product, at least one parameter of the one or more parameters of the winding law making it possible to axially vary the thickness of the layer of self-sealing product is varied, the at least one parameter of the one or more parameters being chosen from among:
   a winding pitch of the strip or of the bead,
   a winding speed of the strip or of the bead in relation to a device for applying the strip or the bead to an inside of the tire,
   an axial movement speed of the tire in relation to a device for applying the strip or the bead to an inside of the tire,
   an extrusion rate of a device for extruding the strip or the bead,
   a width of the strip or of the bead, and
   a thickness of the strip or of the bead.

3. The method according to claim 1,
   wherein, for each value of i ranging from 1 to L, at least 50% of the values of j ranging from 1 to M are such that Nbj<Nai.

4. The method according to claim 3, wherein, for each value of i ranging from 1 to L, at least 50% of the values of j ranging from 1 to M are such that Nai/Nbj≥1.20.

5. The method according to claim 3, wherein, for each value of i ranging from 1 to L, at least 50% of the values of j ranging from 1 to M are such that Nai/Nbj≤3.00.

6. The method according to claim 1, wherein, with the layer of self-sealing product being axially delimited by two axial ends, the strip or the bead of self-sealing material is wound without interrupting the strip or the bead between the two axial ends.

7. The method according to claim 1, wherein, with the layer of self-sealing product being axially delimited by two axial ends, the strip or the bead of self-sealing material is wound starting from one of the two axial ends and winding the strip or the bead of self-sealing material is stopped when the other one of the two axial ends is reached.

* * * * *